(12) United States Patent
Hershey et al.

(10) Patent No.: US 7,961,572 B2
(45) Date of Patent: Jun. 14, 2011

(54) SYSTEM AND METHOD FOR READING MICRO-HOLOGRAMS WITH REDUCED ERROR RATES

(75) Inventors: John Erik Hershey, Niskayuna, NY (US); Kenneth Brakeley Welles, Scotia, NY (US); John Anderson Fergus Ross, Niskayuna, NY (US); John Frederick Graf, Ballston Lake, NY (US); Brian Lee Lawrence, Niskayuna, NY (US); Xiaolei Shi, Niskayuna, NY (US); Zhiyuan Ren, Maita, NY (US); Victor Petrovich Ostroverkhov, Ballston, NY (US)

(73) Assignee: General Electric Company, Schnectady, NY (US)

( * ) Notice: Subject to any disclaimer, the term of this patent is extended or adjusted under 35 U.S.C. 154(b) by 253 days.

(21) Appl. No.: 12/414,234

(22) Filed: Mar. 30, 2009

(65) Prior Publication Data
US 2010/0246354 A1    Sep. 30, 2010

(51) Int. Cl.
*G11B 7/00* (2006.01)
(52) U.S. Cl. .......... 369/47.53; 369/47.5; 369/53.2; 369/53.41; 369/103
(58) Field of Classification Search .......... None
See application file for complete search history.

(56) References Cited

U.S. PATENT DOCUMENTS

| | | | |
|---|---|---|---|
| 5,450,218 A | 9/1995 | Heanue et al. | |
| 5,510,912 A | 4/1996 | Blaum et al. | |
| 5,727,226 A | 3/1998 | Blaum et al. | |
| 5,808,998 A | 9/1998 | Curtis et al. | |
| 6,175,317 B1 | 1/2001 | Ordentlich et al. | |
| 6,549,664 B1 | 4/2003 | Daiber et al. | |
| 6,563,779 B1 | 5/2003 | McDonald et al. | |
| 6,711,711 B2 | 3/2004 | Hwang | |
| 6,738,322 B2 | 5/2004 | Amble et al. | |
| 6,889,907 B2 | 5/2005 | Roh | |
| 7,020,054 B2 | 3/2006 | Kadlec et al. | |
| 7,085,210 B2* | 8/2006 | Ogawa | 369/47.53 |
| 7,388,695 B2 | 6/2008 | Lawrence et al. | |
| 2005/0136333 A1 | 6/2005 | Lawrence et al. | |
| 2006/0073392 A1 | 4/2006 | Erben et al. | |
| 2006/0078802 A1 | 4/2006 | Chan et al. | |

(Continued)

OTHER PUBLICATIONS

Freeman et al.; Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

(Continued)

*Primary Examiner* — Muhammad N Edun
(74) *Attorney, Agent, or Firm* — Fletcher Yoder (57) ABSTRACT

The present techniques provide methods and systems reading a data bit of interest on an optical data disc with a reduced error rate. The data bit estimation may be improved by reducing deterministic noise resulting from an optical reader system and/or the optical data disc. The reader may adjust the position of a detector to detect light scattered from the disc based on parameters of known noise sources. In one embodiment, the detector may be moved vertically in relation to the data bit of interest on the optical disc. In another embodiment, more than one detector may be used to detect light scattered from a data bit of interest. In embodiments, the positioning of the detector(s) may be based on system or disc parameters, and the detected scatterings may provide a data reading, improved for an optical return from a present micro-hologram.

25 Claims, 5 Drawing Sheets

U.S. PATENT DOCUMENTS

| | | | |
|---|---|---|---|
| 2006/0203693 A1* | 9/2006 | Aoyama | 369/116 |
| 2007/0097469 A1 | 5/2007 | Erben et al. | |
| 2007/0146835 A1 | 6/2007 | Erben et al. | |
| 2008/0055686 A1 | 3/2008 | Erben et al. | |
| 2008/0144145 A1 | 6/2008 | Boden et al. | |
| 2008/0144146 A1 | 6/2008 | Boden et al. | |

OTHER PUBLICATIONS

Steinbuch et al.; Limits of Implementation: A CD Player Control Case Study, Proceedings of the American Control Conference, Blatimore, Maryland, Jun. 1994, pp. 3209-3213, Article No. FP2-5:00.

U.S. Appl. No. 12/347,178, filed Dec. 31, 2008, Victor Petrovich Ostroverkhov.

U.S. Appl. No. 12/336,399, filed Dec. 16, 2008, John Erik Hershey et al.

U.S. Appl. No. 12/336,414, filed Dec. 16, 2008, John Anderson Fergus Ross et al.

U.S. Appl. No. 12/336,457, filed Dec. 17, 2008, John Anderson Fergus Ross et al.

U.S. Appl. No. 12/338,828, filed Dec. 18, 2008, John Anderson Fergus Ross et al.

U.S. Appl. No. 12/338,841, filed Dec. 18, 2008, John Anderson Fergus Ross et al.

U.S. Appl. No. 12/342,794, filed Dec. 23, 2008, John Anderson Fergus Ross et al.

U.S. Appl. No. 12/343,204, filed Dec. 23, 2008, Ruediger Kusch.

U.S. Appl. No. 12/346,279, filed Dec. 30, 2008, Victor Petrovich Ostroverkhov.

U.S. Appl. No. 12/346,378, filed Dec. 30, 2008, Xiaolei Shi.

U.S. Appl. No. 12/347,211, filed Dec. 31, 2008, Xiaolei Shi et al.

* cited by examiner

SYSTEM AND METHOD FOR READING MICRO-HOLOGRAMS WITH REDUCED ERROR RATES

BACKGROUND

The present techniques relate generally to bit-wise optical data storage techniques. More specifically, the techniques relate to methods and systems for reducing error rates while reading bits on optical discs.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disc, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080p), have become popular, storage formats capable of holding full-length feature films recorded at these resolutions have become desirable. This has prompted the development of high-capacity recording formats, such as the Blu-ray Disk™ format, which is capable of holding about 25 GB in a single-layer disc, or 50 GB in a dual-layer disc. As resolution of video displays, and other technologies, continue to develop, storage media with ever-higher capacities will become more important. One developing storage technology that may better achieve future capacity requirements in the storage industry is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data, typically a plurality of bits, is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit may be written as a micro-hologram, or Bragg reflection grating, typically generated by two counter-propagating focused recording beams. The data is then retrieved by using a read beam to reflect off the micro-hologram to reconstruct the recording beam. Accordingly, micro-holographic data storage is more similar to current technologies than page-wise holographic storage. However, in contrast to the two layers of data storage that may be used in DVD and Blu-ray Disc™ formats, holographic discs may have 50 or 100 layers of data storage, providing data storage capacities that may be measured in terabytes (TB). Further, as for page-based holographic data storage, each micro-hologram contains phase information from the signal.

Although holographic storage systems may provide much higher storage capacities than prior optical systems, as is the case for all optical storage media, they may be vulnerable to interferences. For example, interferences may result from the closely spaced bits in adjacent tracks and layers. Techniques that allow more accurate reading of these closely spaced bits may be advantageous.

BRIEF DESCRIPTION

An embodiment of the present techniques provides a method of reading an optical data disc. The method includes directing a read beam towards a data bit of interest to generate an optical return, which includes light from the read beam scattered by the data bit of interest. The method further includes detecting the optical return from multiple positions and analyzing the optical return from each of the multiple positions to obtain an improved estimate. The improved estimate enables a better estimation of the state of the data bit of interest than the optical returns from each of the multiple positions.

Another embodiment provides a system for reading a data disc. The system includes a detector, a comparator, a bit predictor, and a processor. The detector is configured to detect optical returns from a sequence of data positions on an optical disc from multiple positions, and the comparator is configured to analyze the optical returns to obtain an improved estimate. The bit predictor predicts a bit value at each position based on the improved estimate, forming a bit stream, and the processor analyzes the bit stream to generate a data signal.

A further embodiment provides a method of reducing error in reading a data bit of interest on an optical disc. The method comprises positioning the detector to obtain a data reading from the data bit of interest, based on one or more parameters of either the optical data disc or the system for reading the optical data disc. The method further comprises detecting multiple data readings, where a data reading is detected from each of the multiple detector positions. Further, an improved estimate is obtained based on the multiple data readings.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Bit-wise holographic data storage systems typically use a focused laser as a read beam to read data bits, represented by the presence or absence of micro-holograms on a data disc. Each of the micro-holograms act as a Bragg reflector, which uses an interference pattern to reflect a narrow frequency band of light by constructive and destructive interference. The Bragg reflector may also carry phase information in the interference pattern. An optical reader system determines a bit state by estimating whether a micro-hologram is present at a given bit position. This estimation may generally be based on an optical return of a reading beam reflected from a present micro-hologram and received at the detector of the optical reader system. However, though a reading beam may be directed to a particular data position, micro-holograms that are adjacent to the data position of interest may also reflect a portion of the reading beam resulting in interferences and affecting the estimation of a micro-hologram's presence in the data position of interest. Such interferences may limit the minimum separation between adjacent data positions in holographic storage systems, and may also limit data storage in other optical storage systems that use pits and lands for data storage, including DVDs, Blu-Ray™ discs, and the like.

Typical methods of reducing the error rate from a signal involve error correction coding that assumes random noise. However, the noise affecting the bit state estimation in an optical storage system may be deterministic rather than random. By considering certain parameters in a bit read process, the error rate in estimating the state of a bit may be reduced.

The present techniques provide methods and systems for reducing error rate in reading optical data discs by addressing sources of deterministic noise. For example, in a read process, an optical reader system may estimate the presence or absence of a micro-hologram by considering parameters such as the spacing of data positions in data tracks, spacing of data tracks in a data layer, the spacing of data layers in an optical disc, and the optical return of the read beam. The reader system may also consider the shape of the reading lens, the number of reading events, the particular modulation and demodulation coding method employed in reading data, and the information gained in prior readings of a data position.

Embodiments of the present techniques may address error reduction in reading any optical storage discs using pits and lands for data storage. While examples used herein may refer to holographic storage systems, the present techniques may also extend to non-holographic storage systems. In the holographic storage system examples, data bits may have a "1" state or a "0" state in data bit positions along data tracks in an optical disc data layer. A bit state may be based on whether a micro-hologram is present or absent. For example, a present micro-hologram may refer to a bit state of 1 while an absent micro-hologram may refer to a bit state of 0.

Figure 1:
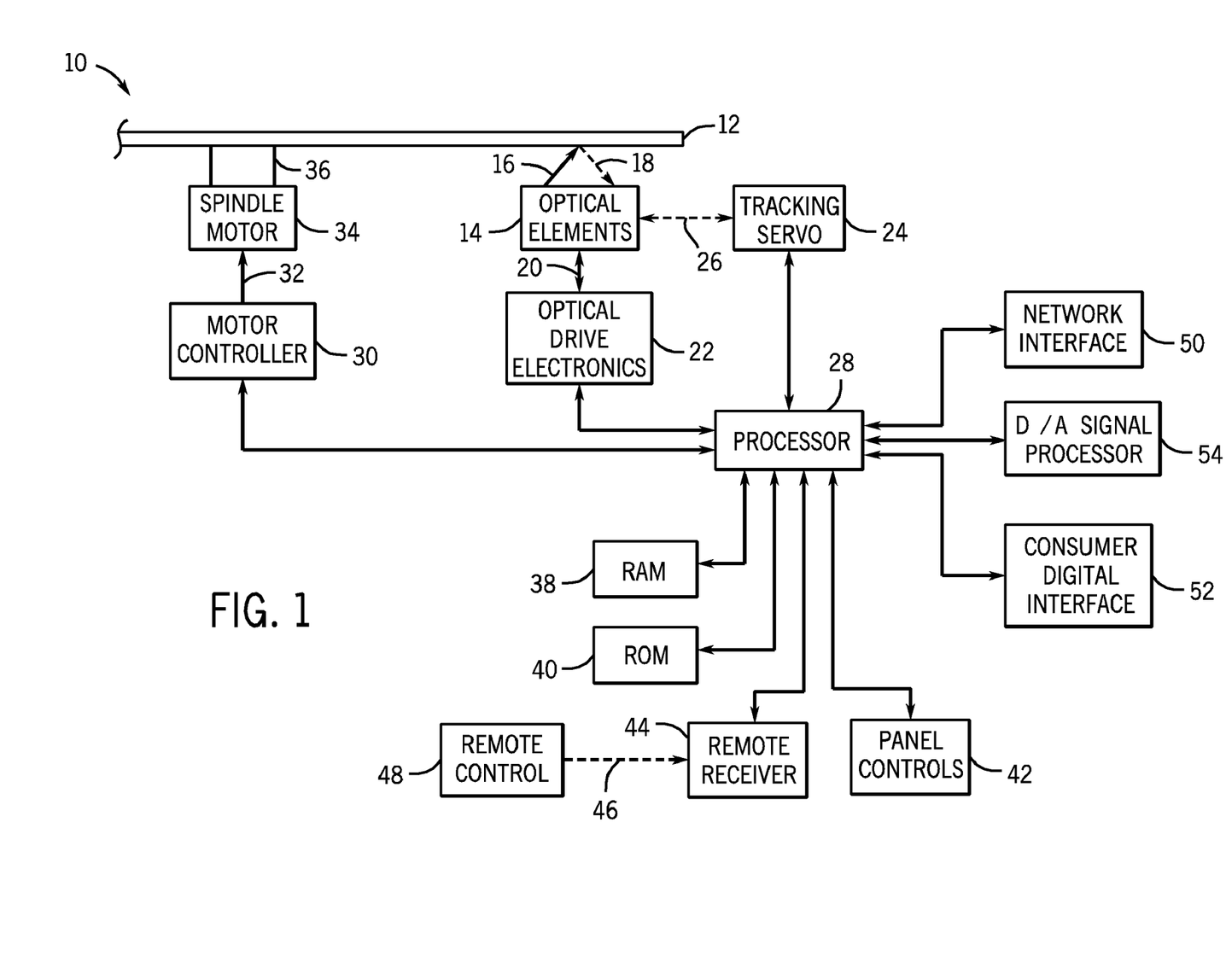
FIG. 1 is a block diagram of an optical disc reader, in accordance with an embodiment of the present techniques.

Turning now to the figures, FIG. 1 is an optical reader system 10 that may be used to read data from optical storage discs 12. The data stored on the optical data disc 12 is read by a series of optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 may be controlled by a processor 28 or may be controlled by dedicated servo electronics. The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disc may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
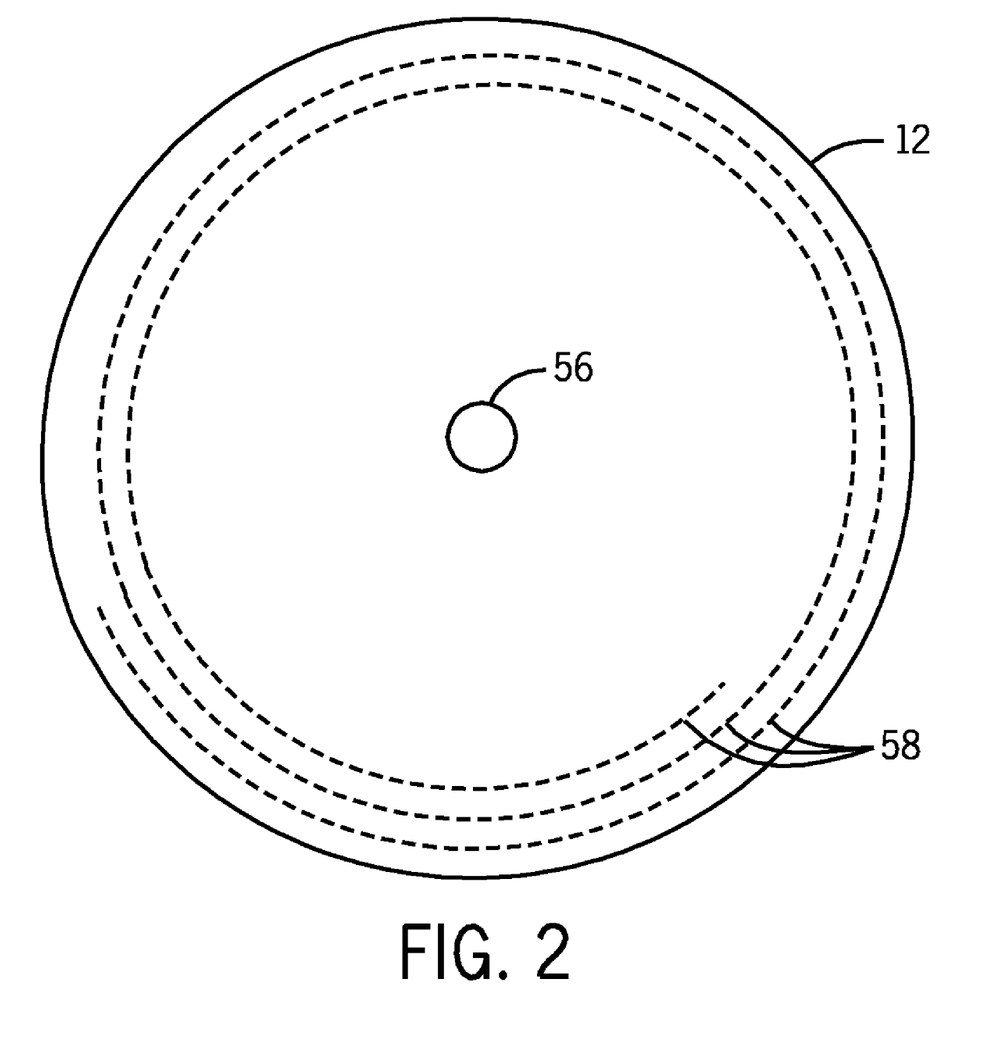
FIG. 2 illustrates an optical disc having data tracks, in accordance with an embodiment.

The reader 10 may be used to read an optical data disc 12 containing data as shown in FIG. 2. Generally, the optical data disc 12 is a flat, round disc with one or more data storage layers embedded in a transparent protective coating. The protective coating may be a transparent plastic, such as polycarbonate, polyacrylate, and the like. The data layers may include any number of surfaces that may reflect light, such as the micro-holograms used for bit-wise holographic data storage. The disc 12 may also include a reflective surface with pits and lands. A spindle hole 56 couples to the spindle to control the rotation speed of the disc 12. The data may be generally written in a sequential spiraling track 58 from the outer edge of the disc 12 to an inner limit, although individual circular data tracks, or other configurations, may be used.

Typically, an optical reader system may determine whether a micro-hologram is present at a targeted data bit position by determining whether the light intensity at a detector rises above a threshold value. If the light intensity reading rises above a threshold, this may indicate that a micro-hologram is present at the target position and reflecting the reading beam. If the light intensity reading does not meet the threshold, this may indicate that the reading beam has not been reflected by a micro-hologram at the target position, and no micro-hologram is present at the target position. However, this conventional method may result in reading inaccuracies if, for example, adjacent micro-holograms reflect portions of the reading beam. In this situation, the reflections from adjacent micro-holograms may interfere with the reading of the target position, as a light intensity reading may cross a threshold value even when no micro-hologram is present at the target position.

The present techniques may decrease error rates by addressing some of the known causes of interferences in the read process. Embodiments of the present techniques may be based on one or more parameters involved in the read process, such as the micro-hologram spacing in the data tracks and data layers of the disc 12, the number of readings for a particular target position(s), the numerical aperture of the reading lens, the modulation coding method employed in the optical storage system, and information gained from prior reading(s). Thus, a reading process that is adjusted based on the parameters of the optical storage and reader systems may enable a reader 10 to reduce error rates associated with the parameters.

One embodiment for reducing micro-hologram estimation error rates involves detecting a reading beam returned on reading a target data bit position on an optical disc 12 at different distances from the target data bit position. The different positions may depend on one or more of the parameters previously discussed, and the readings produced from the different detector positions may be analyzed to enable a better estimation of micro-hologram presence. Once the light intensity readings from the different detector positions are received, the reader system 10 may analyze and/or process the different readings to better estimate whether a micro-hologram is present. For example, two different readings, each from a different position of the detector, may be compared to determine whether the light intensity returned from a target data bit indicates that a micro-hologram is present.

In one embodiment, the light intensity reading from one position may be subtracted from the light intensity reading from another position, and the absolute value of the difference in intensity readings, or the difference signal, may enable the reader 10 to better estimate micro-hologram presence. For example, the difference signal may indicate an appreciable peak in intensity at a target data bit position, indicating that a micro-hologram is present, where an appreciable peak is defined as a value that exceeds a specified threshold. Conversely, if a micro-hologram is not present at the target position, a reader 10 may detect no appreciable peak in intensity in the difference signal.

Processing or analyzing readings obtained from different positions of the detector may enable the reader 10 to determine an "improved estimate." The improved estimate may enable the reader system 10 to better estimate the state of a bit compared to estimates made by an individual reading. More specifically, this improved estimate may be obtained by taking the difference of two readings, as previously described, or may be obtained from other methods of comparison, analyses, and/or processing of the readings from different detector positions. The improved estimate may also be based on a reading selected from multiple readings from different detector positions. For example, the improved estimate may be selected for having a higher SNR than the other multiple readings taken from different detector positions.

As used herein, the "readings" may refer to light detected in an optical reader system 10, and may also be referred to as optical returns, light reflections, or light intensity readings. The readings may be in the form of an analog signal, and may also be converted to a digital signal by the reader system 10. Also as used herein, the reading beam may refer to a light beam (e.g., a laser beam) emitted by the detector or an emitter to read data in an optical storage disc. The term "beam skirt" may also be used herein, and may refer to the cross sectional area of the reading beam at the optical disc 12. The optical return received at the detector may include portions of the reading beam that have been reflected or scattered by a micro-hologram(s), or other elements in the disc 12 or reader system 10. As will be discussed, the reading beam may be "scattered" in various directions by a micro-hologram. The term "reflected" may refer to the backwards scattering of the reading beam that is substantially opposite and parallel to the original direction of the reading beam.

Figure 3:
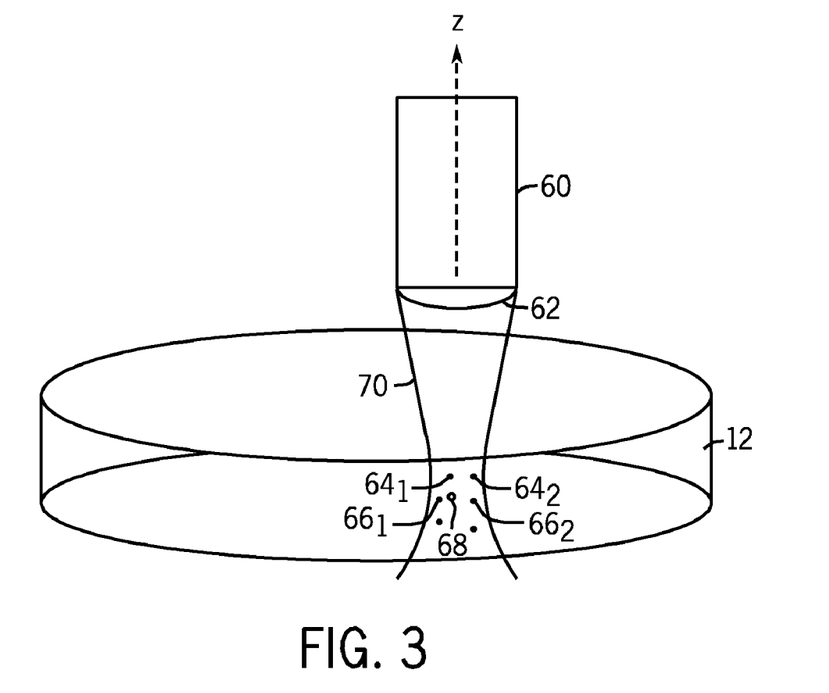
FIG. 3 depicts a detector reading an optical disc having multiple data layers, in accordance with an embodiment.

Embodiments for adjusting a detector position are further explained in FIGS. 3-6. In FIG. 3, a detector module 60 and a lens system 62 are positioned over an optical disc 12 (as in FIGS. 1 and 2). The detector module 60 and lens system 62 may be part of an optical reader system 10 (as in FIG. 1). The disc 12 may comprise more than one data layer, which may each have data tracks of micro-hologram positions. For example, micro-holograms $64_1$ and $64_2$ may be on one data layer, and micro-holograms $66_1$ and $66_2$ may be on another data layer. A reader system 10 may select a data bit position to be read, or a target data position 68. As discussed, a micro-hologram may either be present or absent at a data position, and some examples in this application may explain the read process while assuming that a micro-hologram is either present or absent at the target data position 68. For example, in FIG. 3, a micro-hologram may be present at the target data position 68.

The detector 60 may emit a reading beam directed to the target data position 68. The reading beam may have a beam skirt 70, and though the reading beam may be directed to a target data position 68, the beam skirt 70 may have a certain cross sectional area on the optical disc 12. More specifically, the cross sectional area of the beam skirt 70 may be greater than the area of a target data position 68, and the beam skirt 70 may be reflected by not only a micro-hologram at a target data position 68, but also by adjacent micro-holograms $64_1$, $64_2$, $66_1$, and $66_2$. Light scattered by adjacent micro-holograms $64_1$, $64_2$, $66_1$, and $66_2$ may travel substantially opposite and parallel to the reading beam and be detected by the detector 60. Therefore, though the reading beam is directed to a target data position 68, the light detected at the detector 60 may also include light scattered by adjacent micro-holograms $64_1$, $64_2$, $66_1$, and $66_2$.

Figure 4:
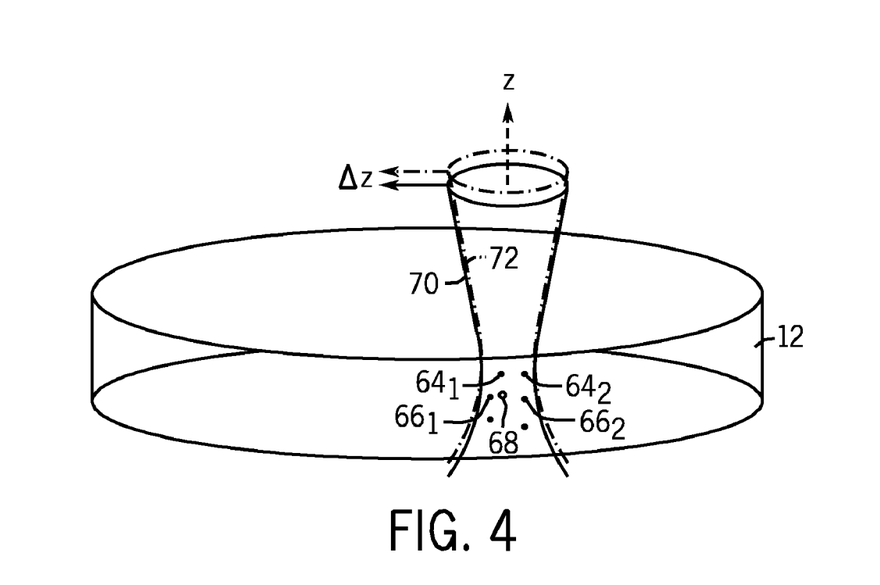
FIG. 4 depicts a vertical displacement of a detector while reading an optical disc, in accordance with an embodiment.

An example of how the position of the detector 60 may be adjusted to obtain more than one optical return for an improved bit state estimation is illustrated in FIG. 4. The detector 60 may detect a return of a reading beam from a target data position 68 from different positions. In one embodiment, the position of the detector 60 may be adjusted vertically, as depicted by $\Delta z$. The detector 60 may detect an optical return from one position, and may be vertically displaced by $\Delta z$ to detect an optical return from another position. The adjustment of the detector 60 may result in a reading beam with a repositioned beam skirt 72 that has a different beam cross section on the target position of the optical disc 12. As discussed, the optical returns detected at different vertical displacements $\Delta z$ of the detector 60 may result in different signals, which may be analyzed and/or processed to improve bit state estimation.

Figure 5:
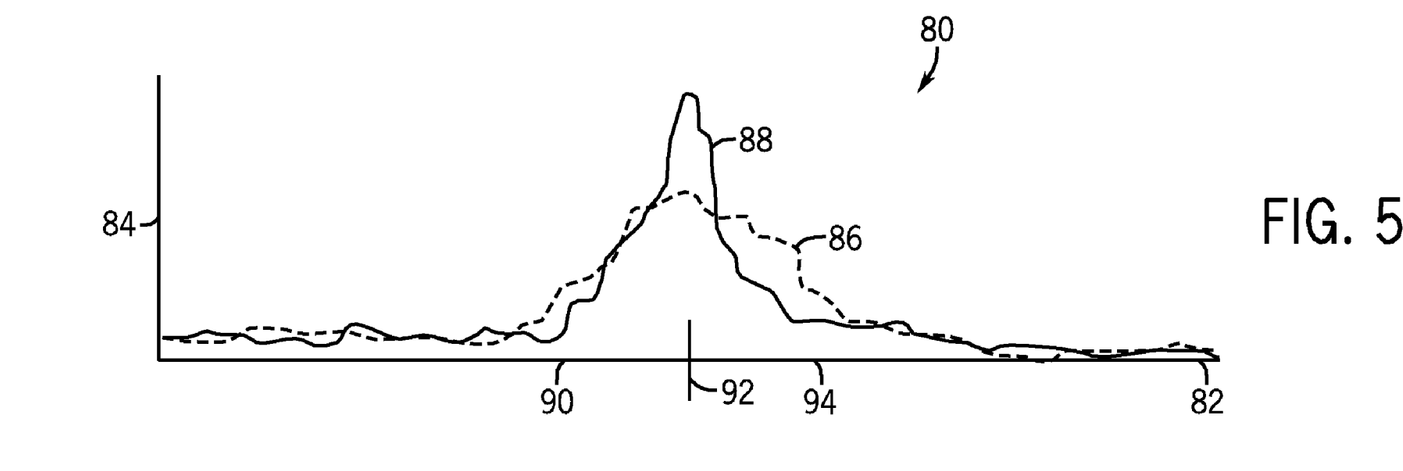
FIG. 5 is a graph illustrating two light intensity measurements detected from a position on an optical disc where a micro-reflector is present, in accordance with an embodiment.
Figure 6:
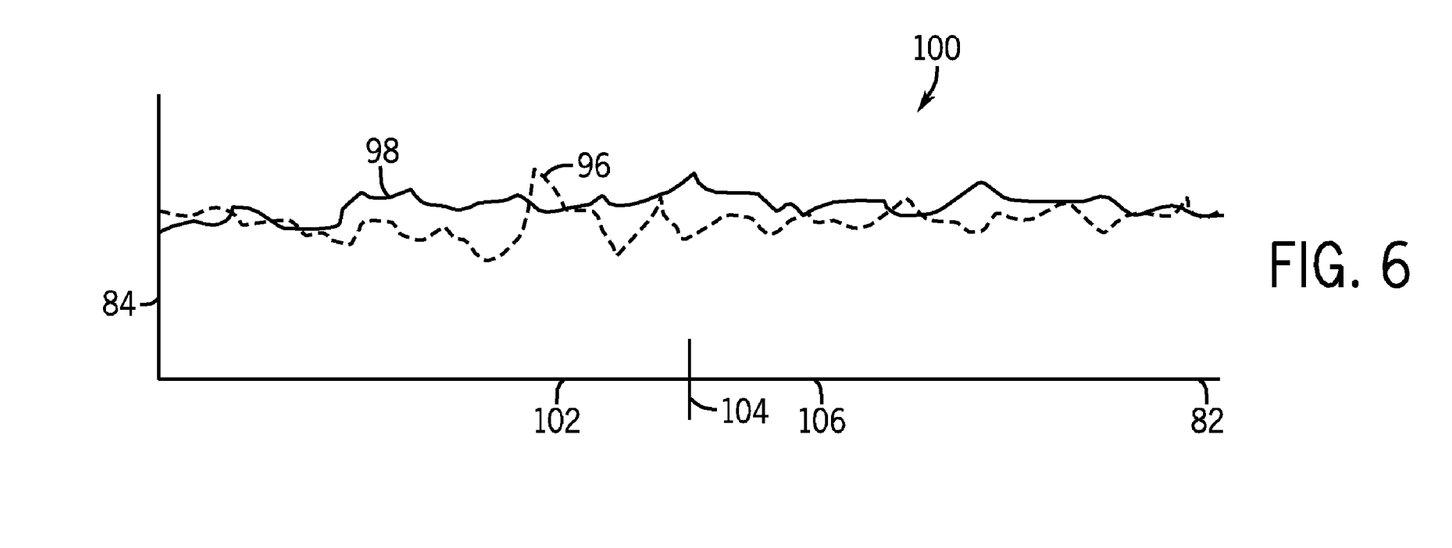
FIG. 6 is a graph illustrating two light intensity measurements detected from a position on an optical disc where no micro-reflector is present.

Graphs of two light intensity readings detected from a detector at two vertical positions are illustrated in FIGS. 5-6. FIG. 5 depicts two light intensity readings of a target data position 68 (as in FIGS. 3-4) when a micro-hologram is present. The horizontal axis 82 of the graph 80 represents the angular position of the center of the reading beam over the optical disc 12. The vertical axis 84 of the graph 80 represents the light intensity at the detector 60 (FIGS. 3-4). For example, while reading a target data position 68, the detector 60 may begin detecting optical returns at an angular position on the disc 12 before the center of the reading beam is positioned over the target data position 68 (position 90 on the graph 80). The disc 12 may rotate during the read process, such that the center of a reading beam emitted by the detector is at the same angular position as the target data position 68 (position 92 on the graph 80). As the disc continues to rotate, the angular position of the reading beam center may pass the angular position of the target data position 68 (position 94). As depicted in the graph 80, the light intensity is the strongest when the angular positions of the reading beam center and the target data position 68 coincide, as the reading beam may be substantially reflected by a target data position 68.

More than one light intensity reading may be detected in reading a target data position 68. For example, the graph 80 depicts two light intensity readings 86 and 88. A first light intensity reading 86 may depict a reading obtained from some position $\Delta z$ of the detector 60, and a second light intensity reading 88 may depict a reading obtained from another position $\Delta z$ of the detector 60. As seen in the graph 80, the second light intensity 88 may be an optical return from the target data position 68 from a position of the detector 60 which returns a better reflection from the target data position 68 than the first light intensity reading 86. Though the graph 80 depicts two light intensity readings 86 and 88, any number of light intensity readings may be taken over different positions of the detector 60. The light intensity readings 86 and 88 may be processed or analyzed by the reader 10 to obtain an improved estimate of the bit state at the target data position 68. More specifically, when reading a target data position 68, a reader system 10 may adjust the position of the detector 60 in more than one position $\Delta z$ and detect optical returns from the target data position 68 at each position $\Delta z$. The optical returns obtained from each position $\Delta z$ are the light intensity readings which may be processed for a better bit state estimate. As discussed, in one embodiment, the light intensity reading from one position $\Delta z$ may be subtracted from the light intensity reading from another position $\Delta z$, and the absolute value of the difference in intensity readings, or the difference signal, may enable an improved estimate of micro-hologram presence in a target data position 68.

During a read process, a reader system 10 may emit a read beam at a target data position 68 where a micro-hologram is not present. For example, the graph 100 of FIG. 6 illustrates two light intensity readings of a target data position 68 on an optical disc 12 (FIG. 1) where no micro-hologram is present. As in the previous graph 80 explained in FIG. 5, the horizontal axis 82 of the graph 100 represents the angular position of the center of the reading beam over the optical disc 12, and the vertical axis 84 of the graph 100 represents the light intensity at the detector 60 (FIGS. 3-4). To read a target data position 68, the detector 60 may begin detecting optical returns at an angular position on the disc 12 before the center of the reading beam is positioned over the target data position 68 (position 102 on the graph 100). The disc 12 may rotate during the read process, such that the center of a reading beam emitted by the detector is at the same angular position on the disc 12 as the target data position 68 (position 104 on the graph 100). As the disc continues to rotate, the angular position of the reading beam center may pass the target data position 68 (position 106 on the graph 100). Because no micro-hologram is present in the target data position 68 in this reading, the light intensity readings may not substantially change when the center of the reading beam passes over the target data position 68.

As in the graph 80 of FIG. 5, the graph 100 of FIG. 6, depicting light intensity readings when no micro-hologram is present, also depicts two light intensity readings 96 and 98. The light intensity reading 96 may depict a reading obtained from some position $\Delta z$ of the detector 60, and a second light intensity reading 98 may depict a reading obtained from another position $\Delta z$ of the detector 60. Analyzing, comparing, and/or processing different readings 96 and 98 detected by the detector 60 from different vertical positions $\Delta z$ over a target data position 68 may enable the reader 10 to obtain an improved bit state estimate at the target data position 68.

In another embodiment of reducing error rate by assuming deterministic noise and addressing known noise sources in reading optical discs, light scattered from a micro-hologram present in a target data position 68 may be detected from more than one position. The positions for detecting light scattering may be based on the pattern of light scattered by the micro-hologram, which may be represented by the bistatic illumination cross section (BICS). The BICS is a representation of an equal power contour surface of the light power that is scattered from a micro-hologram, and may comprise not only light scattered back towards a detector, but also light scattered in other directions (e.g., forward scattered light). Thus, error rates in estimating the presence of a micro-hologram in a target data position 68 may be reduced when more than one detector is positioned to detect light scattered in other directions. One embodiment of the present technique detects light scattered from more than one position, depending on the pattern or light scattered by a micro-hologram. Parameters affecting the pattern of light scattering may include, for example, the shape and position of the micro-hologram, the positions of adjacent micro-holograms, the shape of the optics in the optical reading system, the electronics involved in the reading system, and any of the previously discussed parameters.

Figure 7:
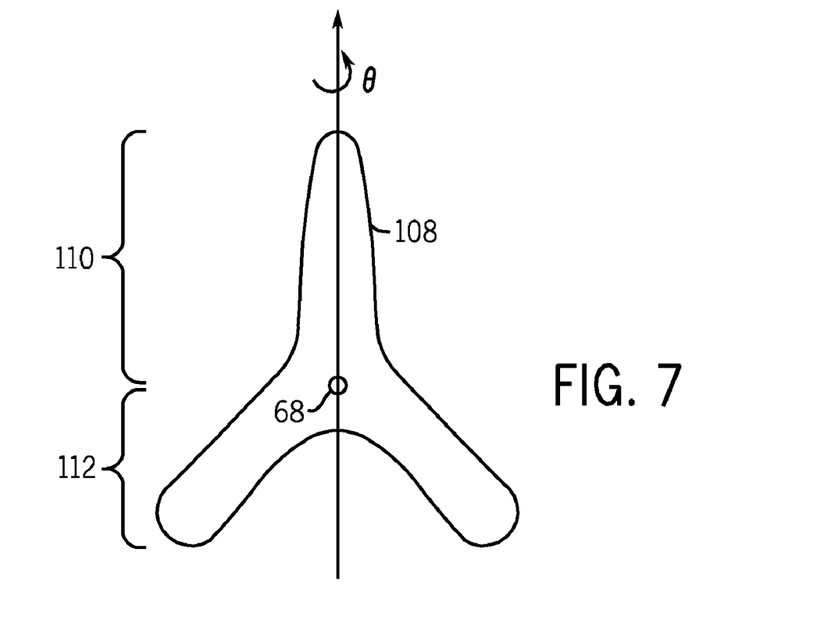
FIG. 7 illustrates the bistatic illumination cross section of a micro-reflector, in accordance with an embodiment.
Figure 8:
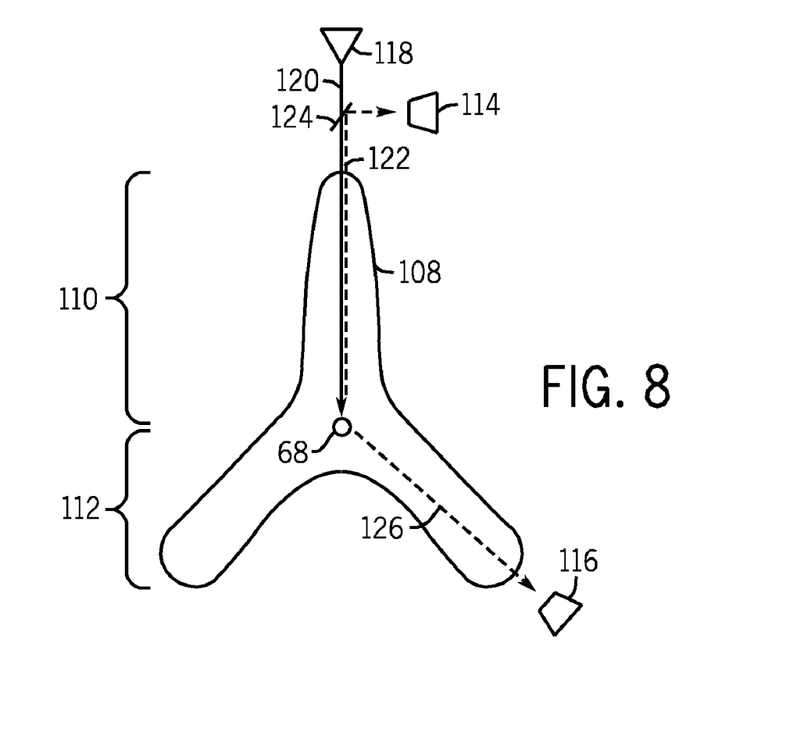
FIG. 8 depicts a technique for reading a micro-reflector using two apertures.

FIGS. 7-8 describe how detecting micro-hologram light scatterings from more than one position based on the pattern of light scattered by the micro-hologram may enable a better bit state estimation in an optical disc 12. As discussed, when a read beam is directed to a target data position 68, a micro-hologram present at the target data position 68 may scatter light in more than one direction. FIG. 7 depicts the BICS 108 of a micro-hologram at a target data position 68, where light may be scattered backwards (approximately bracket 110) from the micro-hologram. This backward-scattered light 110 may also be referred to as the reflected light 110, as the reflected light 110 may be substantially in the same path but opposite direction as the reading beam. The micro-hologram at the target data position 68 may also scatter light forward (approximately bracket 112). The BICS 108, including backward-scattered light 110 and the forward-scattered light 112, may be vertically symmetrical, or symmetric about the z-axis. In conventional holographic reading systems, only the backward-scattered light 110 may be detected. However, in embodiments of the present techniques, other light scatterings from the micro-hologram may be detected, depending on the parameters previously discussed.

An example of how light scattered from a micro-hologram present at a target data position 68 may be detected from multiple positions based on the light scattering pattern is illustrated in FIG. 8. More than one eletro-optical modules (EOMs) 114 and 116 may be positioned in the reader 10 to detect light scattered from a target data position 68. The number of EOMs used in the reading process, and the placement of the EOMs may be based on the BICS 108 of the target data position 68. As discussed, the BICS 108, and the shape of light scattering from the target data position 68, may depend on various elements of the reading process, and deterministic noise may be reduced by adjusting the reading process based on the known elements.

An emitter 118 may emit a reading beam 120 towards a target data position 68. The reading beam 120 may be scattered by the target data position 68, such that there is backward-scattered light 110 and forward scattered light 112. An EOM 114, which may include a detector component, may be positioned to detect a reflection 122 of the reading beam 120 from the target data position 68. The optical path of the reading beam 120 may be manipulated in the reader system 10. For example, a mirror 124 in the reader 10 may direct the beam reflection 122 towards an EOM 114. A second EOM 116 may be positioned to detect forward-scattered light beam 126, which may be a portion of the forward-scattered light 112.

The reader 10 may analyze and/or process the light intensity readings from each EOM 114 and 116. For example, the light intensity readings from each EOM 114 and 116 may be added to produce a combined light intensity reading. This combined reading may enable the reader 10 to better estimate the presence of a micro-hologram at the target data position 68. For example, if an optical return of the reading beam (e.g., beam reflection 122) is weak, a reader 10 may determine that no micro-hologram is present at the target data position 68 because the light intensity does not cross a certain threshold or an appreciable peak in intensity. In some embodiments, the combined reading may cross a threshold and better enable a reader 10 to estimate the bit state at a target data position 68. Alternatively, a single EOM may be employed, wherein the forward scattered light 112 and the backward scattered light 110 are measured on successive readings.

In this embodiment, a target data position 68 may be read only once to produce light intensity readings from multiple EOMs 114 and 116. Furthermore, error rates may be further reduced by multiple readings, or by combination of different error reducing methods of the present techniques. For example, the multiple EOMs 114 and 116 used in FIG. 8 may also be adjusted to different positions as in embodiments discussed in FIG. 4. Embodiments of the present techniques may be used in conjunction, and readings detected in the embodiments may be analyzed and/or processed to obtain an improved estimate of the target data position 68.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of reading an optical data disc, comprising:
    directing a read beam toward a data bit of interest in the optical data disc to generate an optical return, wherein the optical return comprises light from the read beam scattered by the data bit of interest;
    detecting the optical return from multiple positions; and
    analyzing the optical return from each of the multiple positions to obtain an improved estimate, wherein the improved estimate enables a better estimation of a state of the data bit of interest than the optical returns from each of the multiple positions.

2. The method of claim 1, wherein the optical data disc is a holographic disc, and wherein a first bit state of the data bit of interest corresponds to when a micro-hologram is present, and a second bit state of the data bit of interest corresponds to when no micro-hologram is present.

3. The method of claim 1, wherein the state of the data bit of interest is based on whether the data reading crosses a threshold value.

4. The method of claim 1, wherein the multiple positions of the detector are based on one or more of a spacing of data bits in the optical data disc, a size and shape of the data bits, or a number of reading events of the data bit of interest.

5. The method of claim 1, wherein the multiple positions of the detector are based on one or more of a shape of a lens configured to read the optical data disc, electronics involved in the reading of the optical data disc, or other elements involved in the reading of the optical data disc.

6. The method of claim 1, wherein the multiple positions of the detector are based on a modulation coding of the data bits.

7. The method of claim 1, wherein the multiple positions of the detector are based on information gained in previous data readings.

8. The method of claim 1, wherein detecting the optical return from multiple positions reduces error rates due to deterministic noise by addressing at least one noise source in the reading of the optical data disc.

9. The method of claim 1, wherein at each of the multiple positions of the detector, the detector is at a different vertical distance from the data bit of interest.

10. The method of claim 1, wherein analyzing the optical return from each of the multiple positions comprises one or more of comparing the optical returns, taking a difference of the optical returns, processing the optical returns, or selecting a optical return.

11. The method of claim 1, wherein a detector is used for each of the multiple positions.

12. The method of claim 1, wherein the multiple positions comprise one or more of a position to capture backward-scattered light from the data bit of interest, a position to capture forward-scattered light from the data bit of interest, or other positions to capture light scattered from the data bit of interest.

13. A system for reading a data disc, comprising:
- a detector configured to detect optical returns from a sequence of data positions on an optical disc from multiple positions;
- a comparator configured to analyze the optical returns to obtain an improved estimate;
- a bit predictor configured to predict a bit value based on the improved estimate to form a bit stream; and
- a processor configured to analyze the bit stream and generate a data signal.

14. The system of claim 13, wherein the bit predictor comprises an analog computer.

15. The system of claim 13, comprising an analog-to-digital converter.

16. The system of claim 13, comprising an output device configured to provide the data signal to other devices.

17. The system of claim 13, wherein the multiple positions are selected by the system based on one or more parameters of the system or the data disc.

18. The system of claim 13, wherein the multiple positions comprise detector positions of different distances from the optical disc.

19. The system of claim 13, wherein more than one detector is configured to read the sequence of data positions from each of the multiple positions.

20. A method of reducing error in reading a data bit of interest on an optical data disc, comprising:
- positioning a detector to obtain a data reading from the data bit of interest based on one or more parameters of the optical data disc or a system for reading the optical data disc;
- detecting multiple data readings, wherein a data reading is detected from each of multiple detector positions; and
- obtaining an improved estimate based on the multiple data readings.

21. The method of claim 20, wherein a positioning the detector comprises positioning the detector at various vertical distances from the data bit of interest.

22. The method of claim 20, wherein the data bit of interest is read multiple times.

23. The method of claim 20, wherein positioning the detector comprises using multiple detectors in the system.

24. The method of claim 23, wherein the multiple data readings comprise a data reading of the data bit of interest from each of the multiple detectors.

25. The method of claim 23, wherein the data bit of interest is read one time by each of the multiple detectors.

* * * * *